Oct. 18, 1927.
E. KENER, JR
1,645,863
INCINERATOR
Filed Feb. 7, 1924
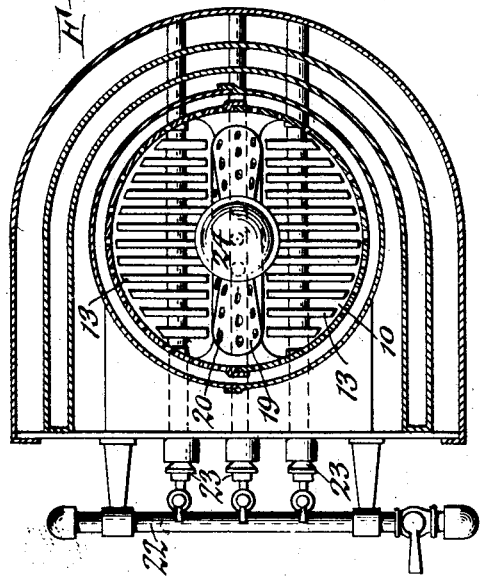
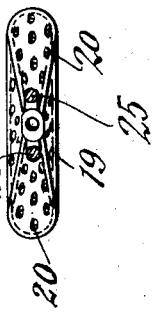
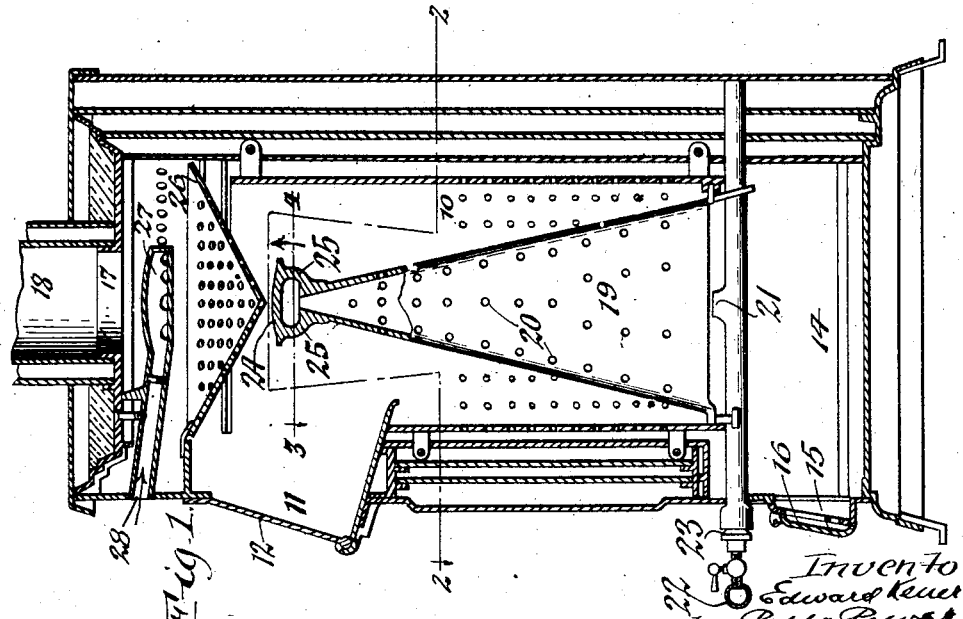

Patented Oct. 18, 1927.

1,645,863

UNITED STATES PATENT OFFICE.

EDWARD KENER, JR., OF BUFFALO, NEW YORK, ASSIGNOR TO BUFFALO CO-OPERATIVE STOVE CO., OF BUFFALO, NEW YORK, A CORPORATION OF NEW YORK.

INCINERATOR.

Application filed February 7, 1924. Serial No. 691,094.

This invention relates to an incinerator which is more particularly designed for disposing of domestic garbage or refuse although the same may also be used to advantage for other purposes.

It has for its object the provision of an apparatus for this purpose which will completely and throughly burn kitchen refuse and the like rapidly and efficiently with a minimum consumption of gaseous fuel and without permitting any objectionable odors to escape to the exterior of the incinerator or the building in which the same is installed.

In the accompanying drawings:

Figure 1 is a vertical section of an incinerator embodying my invention. Figure 2 is a horizontal section of the same taken on line 2—2, Fig. 1. Figures 3 and 4 are horizontal sections taken on line 3—4, Fig. 1, looking downwardly and upwardly, respectively.

Similar characters of reference indicate like parts throughout the several views.

The numeral 10 represents the refuse receptacle or combustion chamber of the incinerator which is adapted to receive the garbage or refuse which is to be destroyed by burning. This material is introduced into the receptacle through an inlet 11 in the upper part of the front side thereof which is normally closed by a door 12. At its lower end the refuse receptacle is provided with a grate which supports the refuse under treatment and which preferably consists of two sections 13, 13 rotatably mounted on the fixed parts of the incinerator so that the ashes resulting from the incineration can be dumped into the ash pit 14 below the refuse chamber and removed from the ash pit through an ash outlet 15 which is normally closed by a door 16.

The top of the refuse receptacle is provided with a gas outlet 17 which communicates with a discharge pipe or flue 18 leading to the exterior of the building.

Arranged centrally within the lower part of the refuse receptacle is an upright burner 19 which preferably has the form of a hollow upwardly tapering cone which is flattened on opposite sides and provided with perforations 20 in different parts of its height. This burner is arranged with its lower large end between the two sections of the grate and on the same level and supported at opposite edges of its lower end on the adjacent parts of the walls of the refuse receptacle, as shown in Figures 1 and 2. The lower end of the burner is open and forms an inlet for gaseous fuel which is supplied thereto by a gas delivery nozzle 21 which opens upwardly and is supplied from a gas supply manifold 22 on the exterior of the apparatus, a suitable air mixer 23 being provided to supply air to the gas for producing a combustible mixture.

As the gas issues from the upper small end of the burner and above the pile of refuse in the receptacle the same, due to its concentration, will not burn. A baffle or deflector 24 is, therefore, provided which preferably has the form of a horizontal disk and which is arranged above the outlet of the burner but close thereto so as to leave only a small intervening space between the upper edge of the tubular burner and the underside of the baffle and projects with its annular margin laterally beyond the periphery of the upper end of the burner and is preferably supported by connecting its underside with the upper end of the burner by means of arms or brackets 25. The underside of this baffle is flat horizontally or substantially so.

Above the baffle is arranged a downwardly tapering conical deflector or spreader 26 which is perforated and supported on the walls of the refuse chamber above its inlet. Between this deflector and the gas outlet at the upper end of the refuse chamber is an auxiliary air supply nozzle 27 which is supplied by a pipe 28 from the exterior of the refuse receptacle.

After the refuse receptacle has been filled with the material which is to be destroyed the gas is turned on and lighted at the delivery nozzle 21 below the large end of the burner. As the flame rises from this nozzle it strikes the inner side of the hollow upwardly tapering burner and heats the refuse resting against the same whereby it is dried and gas is generated as a result of this drying. The flames within the burner also pass laterally outward through those perforations of the same which are above the level of the garbage and thereby ignite and burn the combustible gases which are given off from the top of the pile of refuse during the operation of drying the same. Some of the gas also passes upwardly through the outlet at the small upper end of the burner but owing to its richness will not ignite until it has been spread horizontally by the baffle and mixed with a sufficient quantity of air above the refuse to render the same combustible when it will become ignited by the flames issuing from some of the lower openings in the burner. Thereafter the gas issuing from the upper end of the burner will remain lighted and burn as a steady flame which over-casts the top of the pile of refuse and forms a flame screen through which the gases generated by the drying process must pass and thus cause any combustible elements in these gases to be consumed before they reach the chimney or outlet flue of the refuse receptacle. As the pile of garbage grows less in height while the burning progresses a gradually increasing number of holes in the burner are exposed from the top downward, thereby increasing the size of the flame which overspreads the refuse and causes the same to penetrate with gradually increasing effectiveness the mass of refuse which becomes more dense as the pile is reduced and thus insures continued consumption of the same down to its bottom. By thus overspreading the top of the mass of garbage by a flame which intercepts the gases rising from the mass of garbage while being heated all the combustible constituents in the gases are intercepted and positively ignited and burned and only non-combustible gases permitted to escape to the exterior of the apparatus or the building in which the same is installed, thus rendering the cremation of refuse, such as household garbage perfectly odorless and unobjectionable to occupants of neighboring buildings.

Moreover as the refuse is completely reduced to ashes in this apparatus a maximum yield of gas is derived therefrom during its reduction which gas is mixed with the artificial supply, adds heating capacity to the latter for assisting in drying the mass of garbage, and thus enables the apparatus to be operated very economically.

I claim as my invention:

A refuse incinerator comprising a receptacle adapted to receive the material to be burned, an upright upwardly tapering tube arranged centrally within the receptacle and provided at its lower large end with an inlet for gaseous fuel, an outlet at its small upper end and a plurality of perforations in its side at different places throughout the height thereof, and a baffle of comparatively small diameter arranged horizontally above the upper end of said tube and close thereto, and projecting laterally beyond said upper outlet so as to deflect the gas issuing therefrom horizontally over the top of the material and burn over the latter immediately around said tube.

In testimony whereof I affix my signature.

EDWARD KENER, Jr.